United States Patent
Li et al.

(10) Patent No.: US 7,756,343 B2
(45) Date of Patent: Jul. 13, 2010

(54) IMAGE PROCESSING METHOD, IMAGE PROCESSING APPARATUS, AND COMPUTER-READABLE RECORDING MEDIUM STORING IMAGE PROCESSING PROGRAM

(75) Inventors: Yuanzhong Li, Kanagawa-ken (JP); Wataru Ito, Kanagawa-ken (JP)

(73) Assignee: Fujifilm Corporation (JP)

( * ) Notice: Subject to any disclaimer, the term of this patent is extended or adjusted under 35 U.S.C. 154(b) by 956 days.

(21) Appl. No.: 11/525,839

(22) Filed: Sep. 25, 2006

(65) Prior Publication Data

US 2007/0071347 A1   Mar. 29, 2007

(30) Foreign Application Priority Data

Sep. 26, 2005  (JP) .............................. 2005-277107

(51) Int. Cl.
 *G06K 9/00* (2006.01)
 *G06K 9/40* (2006.01)
 *A61B 18/18* (2006.01)
(52) U.S. Cl. ...................... 382/228; 382/118; 382/254; 606/9
(58) Field of Classification Search ................ 382/128, 382/260, 224, 313, 100, 254, 181, 312, 228, 382/118; 606/9; 430/544, 505, 553, 555, 430/557, 558, 270.1, 281.1, 909; 101/467, 101/478; 250/557, 208.1; 358/473

See application file for complete search history.

(56) References Cited

U.S. PATENT DOCUMENTS 6,895,124 B1 * 5/2005 Kira et al. .................. 382/260
7,483,553 B2 * 1/2009 Xu et al. .................... 382/118

FOREIGN PATENT DOCUMENTS

JP   2003-331306 A   11/2003

OTHER PUBLICATIONS

T. F. Cootes, et al., "Active Appearance Models", Proc. European Conference on Computer Vision, vol. 2, pp. 484-498, Springer, 1998.

* cited by examiner

*Primary Examiner*—Sheela C Chawan
(74) *Attorney, Agent, or Firm*—Studebaker & Brackett PC; Donald R. Studebaker (57) ABSTRACT

An unnecessary component such as acne is removed completely from a predetermined structure such as a face in a photograph image without manual operation and skills. An acne removal unit fits to a face region as the structure in the image a mathematical model generated according to a statistical method such as AAM using sample images representing the structure without the component to be removed, and an image reconstruction unit reconstructs an image of the face region based on parameters corresponding to the face region obtained by the fitting of the model. An image is then generated by replacing the face region with the reconstructed image. Since the mathematical model has been generated from the sample images of human faces without acne, the model does not include acne. Therefore, the reconstructed face image generated by fitting the model to the face region does not include acne.

8 Claims, 9 Drawing Sheets

|  | −3sd | 0 | +3sd |
|---|---|---|---|
| THE FIRST PRINCIPAL COMPONENT |  |  |  |
| THE SECOND PRINCIPAL COMPONENT |  |  |  |

THE $i_1$™ PRINCIPAL COMPONENT

THE $i_2$™ PRINCIPAL COMPONENT

IMAGE PROCESSING METHOD, IMAGE PROCESSING APPARATUS, AND COMPUTER-READABLE RECORDING MEDIUM STORING IMAGE PROCESSING PROGRAM

BACKGROUND OF THE INVENTION

1. Field of the Invention

The present invention relates to a method and an apparatus for carrying out image processing that removes a removal target component such as acne from a plurality of images representing a predetermined structure such as human face. The present invention also relates to a computer-readable recording medium storing a program that causes a computer to execute the method.

2. Description of the Related Art

As an example of a technique to remove an unnecessary component in a photograph image, skin enhancement processing for reducing and removing acne and spots in a face region has been known.

More specifically, a method has been proposed for smoothing a small amplitude luminance change such as a wrinkle and a spot by applying and extending an $\epsilon$-filter that separates and removes a small amplitude high frequency noise component superposed in a signal waveform (see U.S. Pat. No. 6,895,124). Furthermore, another method has been proposed for carrying out correction by replacing a spot, freckles, acne, or the like specified by use of a pointing device with surrounding pixels (see Japanese Unexamined Patent Publication No. 2003-331306).

However, the skin enhancement processing described in U.S. Pat. No. 6,895,124 targets only a specific frequency band. Therefore, wrinkles, spots, and the like that exist over wide frequency bands from high to low cannot be removed completely.

Moreover, the skin enhancement processing described in Japanese Unexamined Patent Publication No. 2003-331306 is carried out manually. Therefore, this processing requires skills and is time consuming.

SUMMARY OF THE INVENTION

The present invention has been conceived based on consideration of the above circumstances. An object of the present invention is therefore to provide an image processing method, an image processing apparatus, and a computer-readable recording medium storing an image processing program for completely removing an unnecessary component such as a wrinkle and a spot in a photograph image without manual operation and skills.

A method of image processing of the present invention comprises the step of:

removing a component as a target of removal in a predetermined structure in an input image, by fitting to the structure in the input image a model representing the structure by one or more statistical characteristic quantities having been obtained through execution of predetermined statistical processing on a plurality of images representing the structure not having the component as the target of removal.

An image processing apparatus of the present invention is an apparatus for carrying out the image processing described above. More specifically, the image processing apparatus comprises:

a model representing a predetermined structure by one or more statistical characteristic quantities having been obtained through execution of predetermined statistical processing on a plurality of images representing the structure not having a component as a target of removal; and removal means for removing the component as the target of removal in the predetermined structure in an input image, by fitting the model to the structure in the input image.

A computer-readable recording medium of the present invention stores a program that causes a computer to execute the image processing method.

The component as the target of removal is not represented in the model in the present invention. Therefore, even if the component is included in the predetermined structure in the input image, representation of the structure in the input image by fitting the model to the structure, that is, a processed image, does not include the component as the target of removal. Consequently, the component as the target of removal in the structure can be removed by fitting the model of the present invention to the structure in the input image.

As a specific method of realizing the image processing in the present invention, a method of AAM (Active Appearance Model) can be used. An AAM is one of approaches in interpretation of the content of an image by using a model. For example, in the case where a human face is a target of interpretation, a mathematical model of human face is generated by carrying out principal component analysis on face shapes in a plurality of images to be learned and on information of luminance after normalization of the shapes. A face in a new input image is then represented by principal components in the mathematical model and corresponding weighting parameters, for face image reconstruction (T. F. Cootes et al., "Active Appearance Models", Proc. European Conference on Computer Vision, vol. 2, pp. 484-498, Springer, 1998; hereinafter referred to as Reference 1).

As a specific application example of the image processing of the present invention can be listed removal of acne in a face image by use of the method of AAM. More specifically, a face region in an input image is fit by a model representing a face by statistical characteristic quantity or quantities obtained through principal component analysis carried out on a plurality of images representing faces without acne, for finding one or more weighting parameters for principal components in the mathematical model. The image is then reconstructed according to the parameter or parameters. Since no acne is represented in the model, representation of the face region in the input image by fitting the model to the face region does not include acne even in the case where the face region includes acne in the input image. Therefore, the acne can be removed from the face region in the input image.

The image processing method, the image processing apparatus, and the image processing program of the present invention are described below in detail.

It is preferable for the predetermined structure to be suitable for modeling. In other words, variations in shape and luminance of the predetermined structure in images thereof preferably fall within a predetermined range. Especially, it is preferable for the predetermined structure to generate the statistical characteristic quantity or quantities contributing more to the shape and luminance thereof through the statistical processing thereon. Furthermore, it is preferable for the predetermined structure to be a main part of an image. More specifically, the predetermined structure can be a human face.

It is preferable for the component as the target of removal to generate a characteristic quantity contributing less to the shape and luminance, through the statistical processing. More specifically, the component refers to acne, a wrinkle, a spot, a small scar, stubble, a flare, and the like.

The images representing the predetermined structure without the component as the target of removal may be images obtained by actually photographing the predetermined structure without the component as the target of removal, such as images obtained by photography of human faces without acne. Alternatively, the images may be obtained artificially by carrying out correction for removing the component on images of the structure with the component, such as images without acne obtained by correction of images with acne.

It is preferable for the predetermined statistical processing to be dimension reduction processing that can represent the predetermined structure by the statistical characteristic quantity or quantities of fewer dimensions than the number of pixels representing the predetermined structure. More specifically, the predetermined statistical processing may be multivariate analysis such as principal component analysis. In the case where principal component analysis is carried out as the predetermined statistical processing, the statistical characteristic quantity or quantities refer(s) to principal components obtained through the principal component analysis.

In the case where the predetermined statistical processing is principal component analysis, principal components of higher orders contribute more to the shape and luminance than principal components of lower orders.

In the statistical characteristic quantity or quantities, at least information based on luminance of the structure needs to be represented, since the component as the target of removal is represented in the image by distribution of luminance.

The (predetermined) structure in the input image may be detected automatically or manually. In addition, the present invention may further comprise the step (or means) for detecting the structure in the input image. Alternatively, the structure having been detected in the input image may be input for the fitting of the model.

Fitting the model to the structure in the input image refers to calculation or the like for representing the structure in the input image by the model. More specifically, in the case where the method of AAM described above is used, fitting the model refers to finding values of the weighting parameters for weighting the respective principal components in the mathematical model in order to represent the structure in the input image.

A plurality of models in the present invention may be prepared for respective properties of the predetermined structure. In this case, the steps (or means) may be added to the present invention for obtaining at least one property of the structure in the input image and for selecting one of the models according to the at least one obtained property. The selected model is fit to the structure in the input image.

The properties refer to gender, age, and race in the case where the predetermined structure is human face. The property may be information for identifying an individual. In this case, the models for the respective properties refer to models for respective individuals.

As a specific method of obtaining the property may be listed image recognition processing having been known (such as image recognition processing described in Japanese Unexamined Patent Publication No. 11(1999) -175724). Alternatively, the property may be inferred or obtained based on information such as GPS information accompanying the input image.

According to the image processing method, the image processing apparatus, and the computer-readable recording medium storing the image processing program of the present invention, the model representing the predetermined structure without the removal target component is fit to the structure in the input image, and the removal target component can be removed completely from the structure by automatic processing without manual operation. Therefore, the image can be obtained with extremely high accuracy of removal, without skills for operation and without troublesome operation.

In the case where the plurality of models in the present invention are prepared for the respective properties of the predetermined structure while the steps (or the means) are added for obtaining the property of the structure in the input image and for selecting one of the models in accordance with the at least one obtained property, if the selected model is fit to the structure in the input image, the structure in the input image can be fit by the model that is more suitable. Therefore, processing accuracy is improved, and the image can be obtained in higher quality.

DESCRIPTION OF THE PREFERRED EMBODIMENTS

Hereinafter, embodiments of the present invention are described by reference to the accompanying drawings for the case where acne is removed from a face image through the image processing of the present invention.

Figure 1:
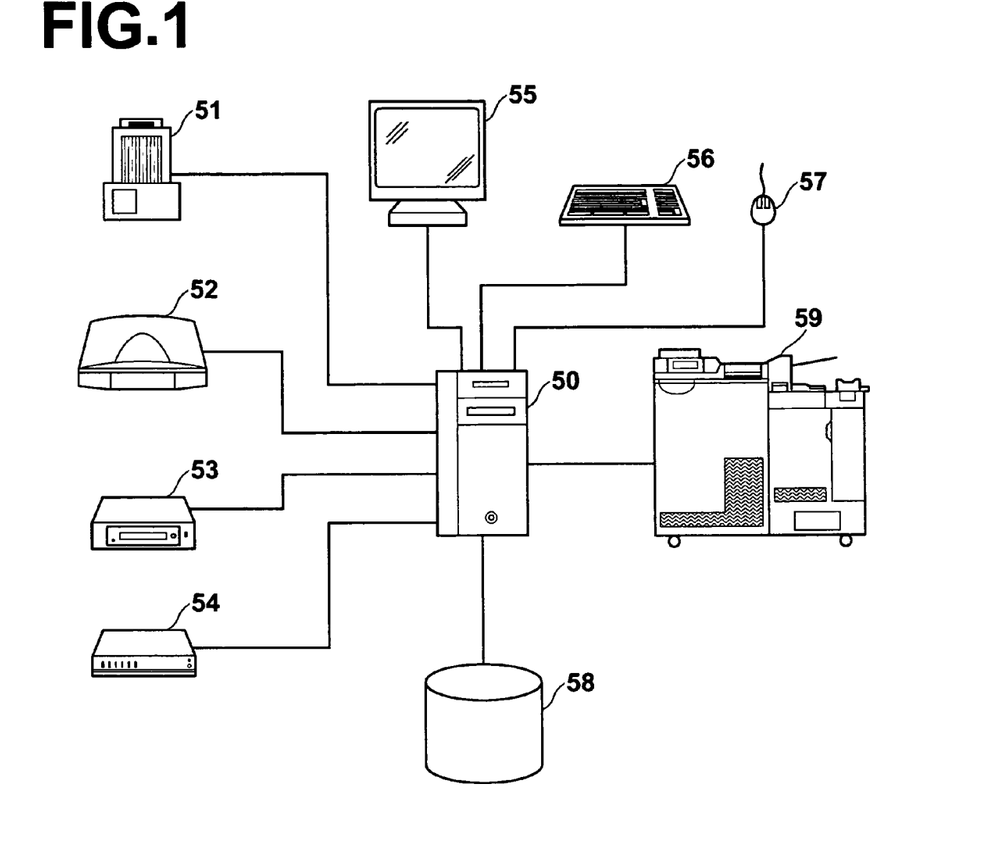
FIG. 1 shows hardware configuration of a digital photograph printer in an embodiment of the present invention.

FIG. 1 shows the hardware configuration of a digital photograph printer in an embodiment of the present invention. As shown in FIG. 1, the digital photograph printer comprises a film scanner 51, a flat head scanner 52, a media drive 53, a network adapter 54, a display 55, a keyboard 56, a mouse 57, a hard disc 58, and a photographic print output machine 59, all of which are connected to an arithmetic and control unit 50.

In cooperation with a CPU, a main storage, and various input/output interfaces, the arithmetic and control unit 50 controls a processing flow regarding an image, such as input, correction, manipulation, and output thereof, by executing a program installed from a recording medium such as a CD-ROM. In addition, the arithmetic and control unit 50 carries out image processing calculation for image correction and manipulation. Acne removal processing of the present invention is also carried out by the arithmetic and control unit 50.

The film scanner 51 photoelectrically reads an APS negative film or a 135-mm negative film developed by a film developer (not shown) for obtaining digital image data P0 representing a photograph image recorded on the negative film.

The flat head scanner 52 photoelectrically reads a photograph image represented in the form of hard copy such as an L-size print, for obtaining digital image data P0.

The media drive 53 obtains digital image data P0 representing a photograph image recorded in a recording medium such as a memory card, a CD, or a DVD. The media drive 53 can also write image data P2 to be output therein. The memory card stores image data representing an image photographed by a digital camera, for example. The CD or the DVD stores data of an image read by the film scanner regarding a previous print order, for example.

The network adapter 54 obtains image data P0 from an order reception machine (not shown) in a network photograph service system having been known. The image data P0 are image data used for a photograph print order placed by a user, and sent from a personal computer of the user via the Internet or via a photograph order reception machine installed in a photo laboratory.

The display 55 displays an operation screen for input, correction, manipulation, and output of an image carried out by the digital photograph printer. A menu for selecting the content of operation and an image to be processed are also displayed thereon, for example. The keyboard 56 and the mouse 57 are used for inputting a processing instruction.

The hard disc 58 stores a program for controlling the digital photograph printer. In the hard disc 58 are also stored temporarily the image data P0 obtained by the film scanner 51, the flat head scanner 52, the media drive 53, and the network adapter 54, in addition to image data P1 having been subjected to image correction (hereinafter referred to as the corrected image data P1) and the image data P2 having been subjected to image manipulation (the image data to be output).

The photographic print output machine 59 carries out laser scanning exposure of photographic printing paper, image development thereon, and drying thereof, based on the image data P2 representing the image to be output. The photographic print output machine 59 also prints printing information on the backside of the paper, cuts the paper for each print, and sorts the paper for each order. The manner of printing may be a laser exposure thermal development dye transfer process or the like.

Figure 2:
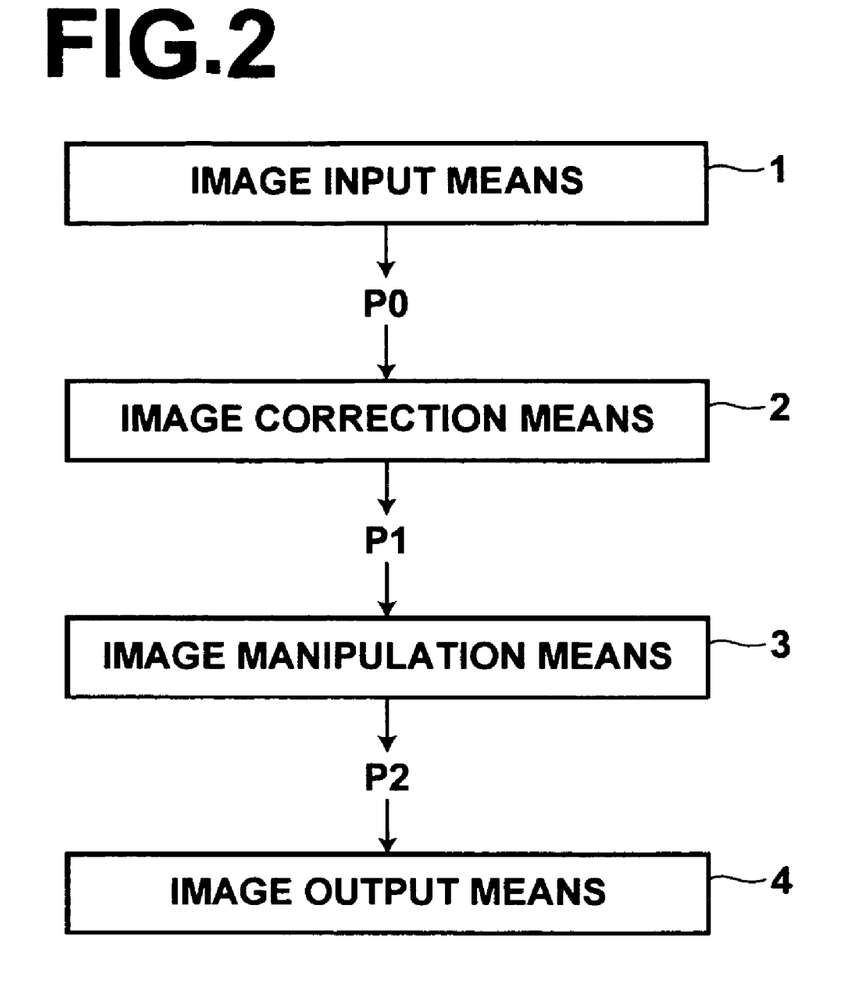
FIG. 2 is a block diagram showing functions and a flow of processing in the digital photograph printer in the embodiment and in a digital camera in another embodiment of the present invention.

FIG. 2 is a block diagram showing functions of the digital photograph printer and the flow of processing carried out therein. As shown in FIG. 2, the digital photograph printer comprises image input means 1, image correction means 2, image manipulation means 3, and image output means 4 in terms of the functions. The image input means 1 inputs the image data P0 of an image to be printed. The image correction means 2 uses the image data P0 as input, and carries out automatic image quality correction of the image represented by the image data P0 (hereinafter, image data and an image represented by the image data are represented by the same reference code) through image processing according to a predetermined image processing condition. The image manipulation means 3 uses the corrected image data P1 having been subjected to the automatic correction as input, and carries out image processing according to an instruction from an operator. The image output means 4 uses the processed image data P2 as input, and outputs a photographic print or outputs the processed image data P2 in a recording medium.

The image correction means 2 carries out processing such as white balance adjustment, contrast correction, sharpness correction, and noise reduction and removal. The image manipulation means 3 carries out manual correction on a result of the processing carried out by the image correction means 2. In addition, the image manipulation means 3 carries out image manipulation such as trimming, scaling, conversion to sepia image, conversion to monochrome image, and compositing with an ornamental frame. The image manipulation means 3 also carries out the acne removal processing of the present invention.

Operation of the digital photograph printer and the flow of the processing therein are described next.

The image input means 1 firstly inputs the image data P0. In the case where an image recorded on a developed film is printed, the operator sets the film on the film scanner 51. In the case where image data stored in a recording medium such as a memory card are printed, the operator sets the recording medium in the media drive 53. A screen for selecting a source of input of the image data is displayed on the display 55, and the operator carries out the selection by using the keyboard 56 or the mouse 57. In the case where "film" has been selected as the source of input, the film scanner 51 photoelectrically reads the film set thereon, and carries out digital conversion. The image data P0 generated in this manner are then sent to the arithmetic and control unit 50. In the case where "hard copy" such as a photographic print has been selected, the flat head scanner 52 photoelectrically reads the hard copy set thereon, and carries out digital conversion. The image data P0 generated in this manner are then sent to the arithmetic and control unit 50. In the case where "recording medium" such as a memory card has been selected, the arithmetic and control unit 50 reads the image data P0 stored in the recording medium such as a memory card set in the media drive 53. In the case where an order has been placed in a network photograph service system or by a photograph order reception machine in a store, the arithmetic and control unit 50 receives the image data P0 via the network adapter 54. The image data P0 obtained in this manner are temporarily stored in the hard disc 58.

The image correction means 2 then carries out the automatic image quality correction on the image represented by the image data P0. More specifically, publicly known processing such as white balance adjustment, contrast correction, sharpness correction, and noise reduction and removal is carried out according to an image processing program executed by the arithmetic and control unit 50, based on a setup condition set on the printer in advance. The corrected image data P1 are output to be stored in a memory of the arithmetic and control unit 50. Alternatively, the corrected image data P1 may be stored temporarily in the hard disc 58.

Figure 3A:
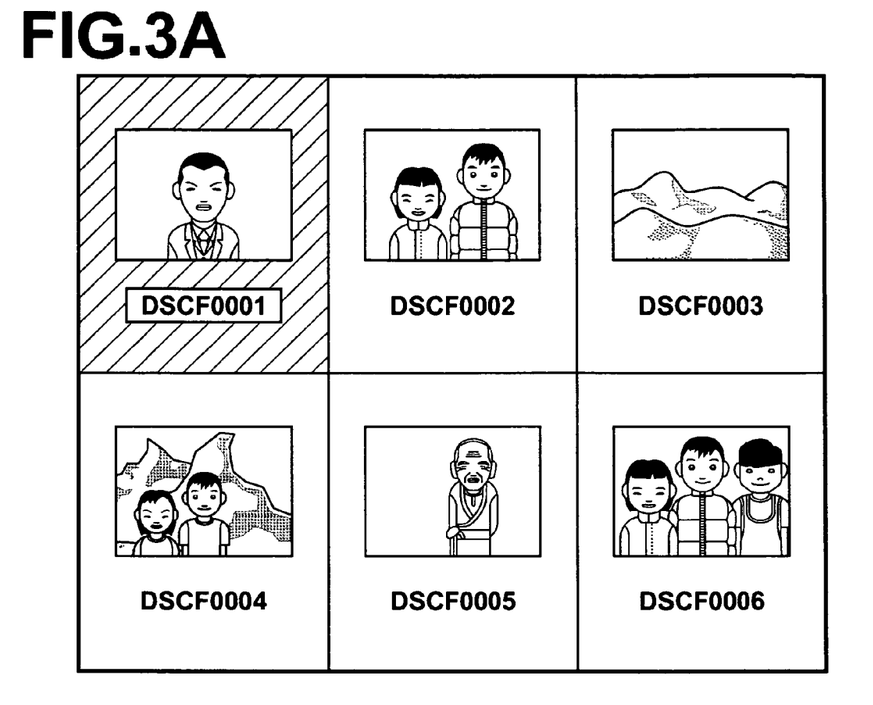
FIGS. 3A and 3B show examples of screens displayed on a display of the digital photograph printer and the digital camera in the embodiments.
Figure 3B:
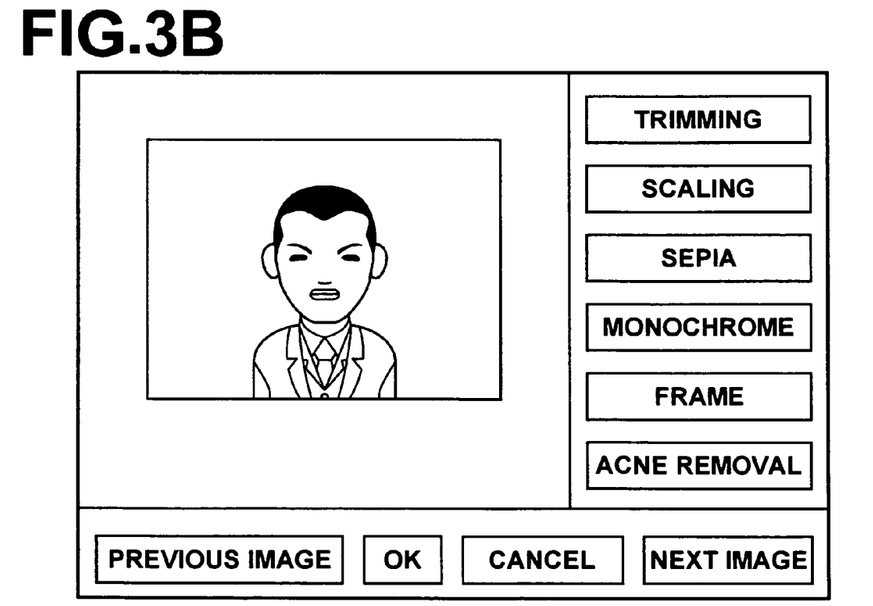

The image manipulation means 3 thereafter generates a thumbnail image of the corrected image P1, and causes the display 55 to display the thumbnail image. FIG. 3A shows an example of a screen displayed on the display 55. The operator confirms displayed thumbnail images, and selects any one of the thumbnail images that needs manual image-quality correction or order processing for image manipulation while using the keyboard 56 or the mouse 57. In FIG. 3A, the image in the upper left corner (DSCF0001) is selected. As shown in FIG. 3B as an example, the selected thumbnail image is enlarged and displayed on the display 55, and buttons are displayed for selecting the content of manual correction and manipulation on the image. The operator selects a desired one of the buttons by using the keyboard 56 or the mouse 57, and carries out detailed setting of the selected content if necessary. The image manipulation means 3 carries out the image processing according to the selected content, and outputs the processed image data P2. The image data P2 are stored in the memory of the arithmetic and control unit 50 or stored temporarily in the hard disc 58. The program executed by the arithmetic and control unit 50 controls image display on the display 55, reception of input from the keyboard 56 or the mouse 57, and image processing such as manual correction and manipulation carried out by the image manipulation means 3.

The image output means 4 finally outputs the image P2. The arithmetic and control unit 50 causes the display 55 to display a screen for image destination selection, and the operator selects a desired one of destinations by using the keyboard 56 or the mouse 57. The arithmetic and control unit 50 sends the image data P2 to the selected destination. In the case where a photographic print is generated, the image data P2 are sent to the photographic print output machine 59 by which the image data P2 are output as a photographic print. In the case where the image data P2 are recorded in a recording medium such as a CD, the image data P2 are written in the CD or the like set in the media drive 53.

Figure 4:
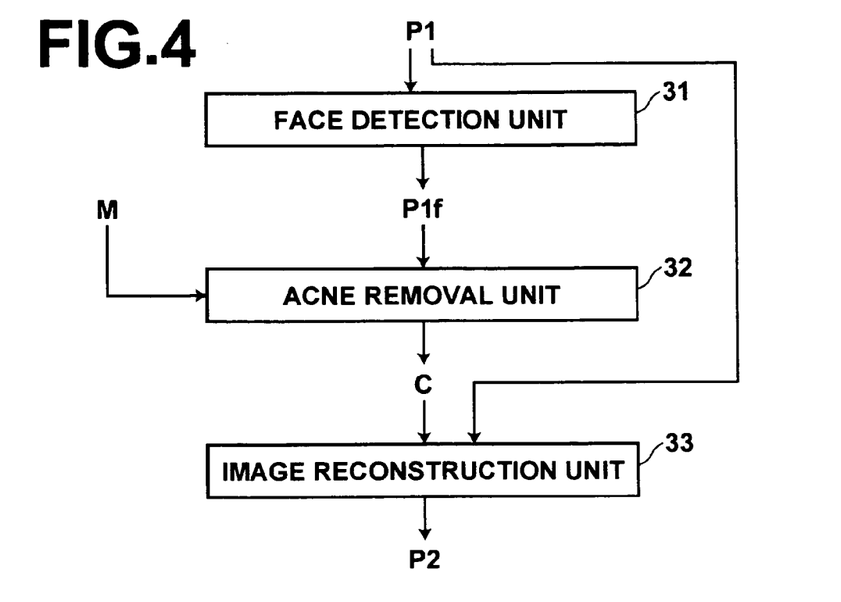
FIG. 4 is a block diagram showing details of acne removal processing in one aspect of the present invention.

Below is described in detail the acne removal processing of the present invention carried out in the case where "Acne Removal" is selected in the screen shown in FIG. 3B during the flow of the processing. FIG. 4 is a block diagram showing details of the acne removal processing. As shown in FIG. 4, the acne removal processing is carried out by a face detection unit 31, an acne removal unit 32, and an image reconstruction unit 33. The face detection unit 31 detects a face region P1$f$ in the image P1. The acne removal unit 32 fits to the detected face region P1$f$ a mathematical model M generated by a method of AAM (see Reference 1 above) based on a plurality of sample images representing human faces without acne, and removes acne in the face region P1$f$. The image reconstruction unit 33 generates an image P1$f'$ of the face region from which the acne has been removed, based on parameters C (which will be described later) corresponding to the face region P1$f$ obtained by the fitting of the mathematical model M, and generates the image P2 wherein the acne in the face region in the image P1 has been removed by replacing the face region P1$f$ in the image P1 with the image P1$f'$. The processing described above is controlled by the program installed in the arithmetic and control unit 50.

Figure 5:
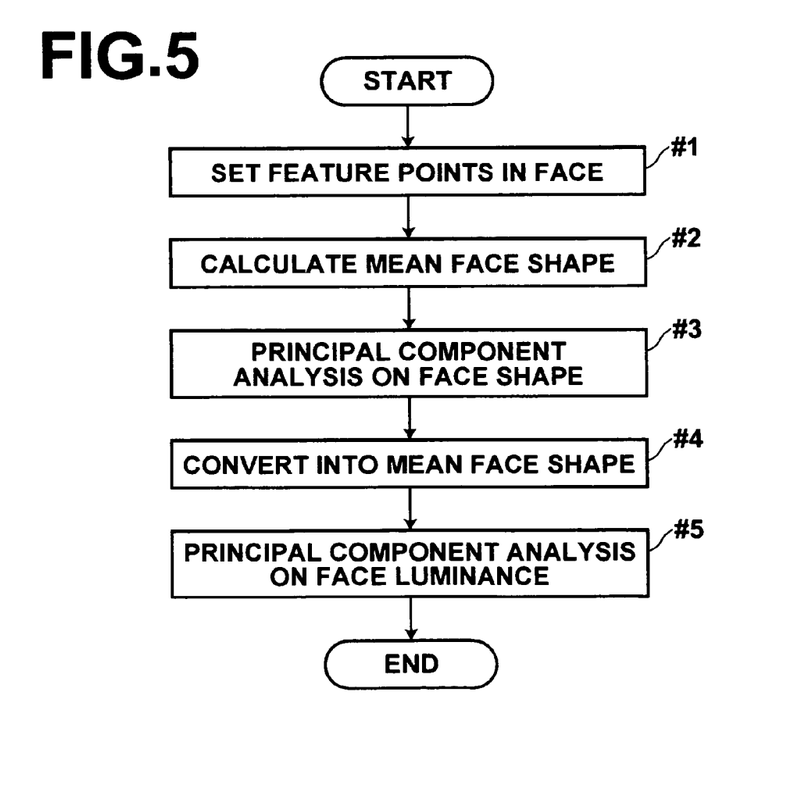
FIG. 5 is a flow chart showing a procedure for generating a mathematical model of face image in the present invention.

The mathematical model M is generated according to a flow chart shown in FIG. 5, and installed in advance together with the programs described above. Hereinafter, how the mathematical model M is generated is described.

Figure 6:
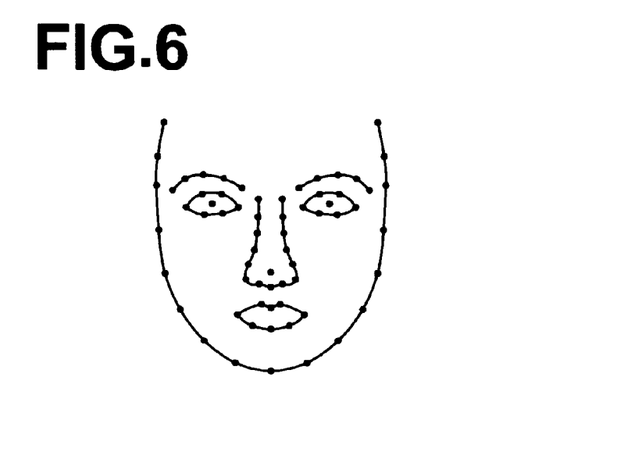
FIG. 6 shows an example of how feature points are set in a face.

For each of the sample images representing human faces without acne, feature points are set therein as shown in FIG. 6 for representing face shape (Step #1). In this case, the number of the feature points is 122. However, only 60 points are shown in FIG. 6 for simplification. Which part of face is represented by which of the feature points is predetermined, such as the left corner of the left eye represented by the first feature point and the center between the eyebrows represented by the 38$^{th}$ feature point. Each of the feature points may be set manually or automatically according to recognition processing. Alternatively, the feature points may be set automatically and later corrected manually upon necessity.

Based on the feature points set in each of the sample images, mean face shape is calculated (Step #2). More specifically, mean values of coordinates of the feature points representing the same part are found among the sample images.

Principal component analysis is then carried out based on the coordinates of the mean face shape and the feature points representing the face shape in each of the sample images (Step #3). As a result, any face shape can be approximated by Equation (1) below:

$$S = S_0 + \sum_{i=1}^{n} p_i b_i \quad (1)$$

Figure 7:
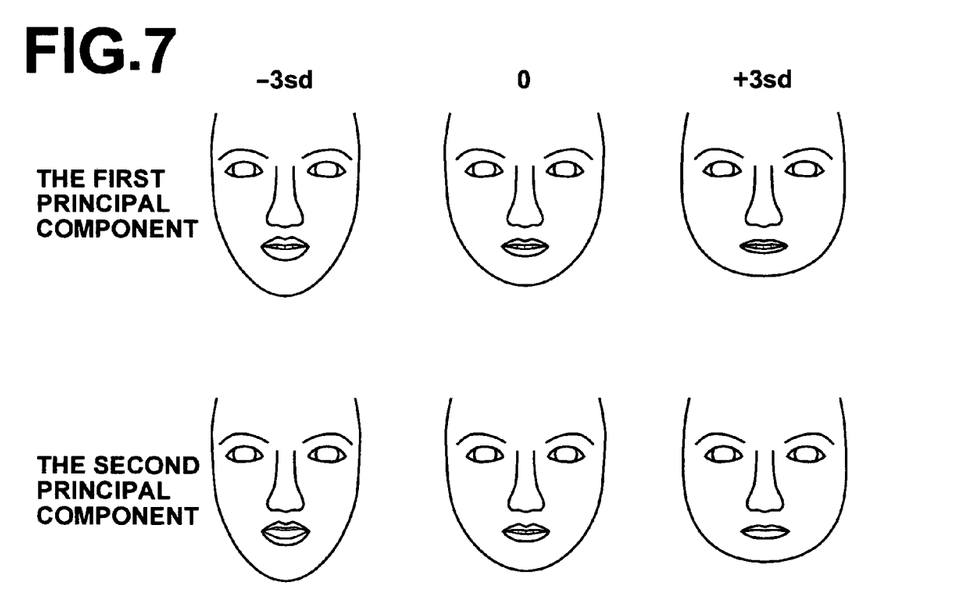
FIG. 7 shows how a face shape changes with change in values of weight coefficients for eigenvectors of principal components obtained through principal component analysis on the face shape.

S and $S_0$ are shape vectors represented respectively by simply listing the coordinates of the feature points ($x_1$, $y_1$, ..., $x_{122}$, $y_{122}$) in the face shape and in the mean face shape, while $p_i$ and $b_i$ are an eigenvector representing the $i^{th}$ principal component for the face shape obtained by the principal component analysis and a weight coefficient therefor, respectively. FIG. 7 shows how face shape changes with change in values of the weight coefficients $b_1$ and $b_2$ for the eigenvectors $p_1$ and $p_2$ as the highest and second-highest order principal components obtained by the principal component analysis. The change ranges from −3 sd to +3 sd where sd refers to standard deviation of each of the weight coefficients $b_1$ and $b_2$ in the case where the face shape in each of the sample images is represented by Equation (1). The face shape in the middle of 3 faces for each of the components represents the face shape in the case where the value of the corresponding weight coefficient is the mean value. In this example, a component contributing to face outline has been extracted as the first principal component through the principal component analysis. By changing the weight coefficient $b_1$, the face shape changes from an elongated shape (corresponding to −3 sd) to a round shape (corresponding to +3 sd). Likewise, a component contributing to how much the mouth is open and to length of chin has been extracted as the second principal component. By changing the weight coefficient $b_2$, the face changes from a state of open mouth and long chin (corresponding to −3 sd) to a state of closed mouth and short chin (corresponding to +3 sd). The smaller the value of i, the better the component explains the shape. In other words, the $i^{th}$ component contributes more to the face shape as the value of i becomes smaller.

Each of the sample images is then subjected to conversion (warping) into the mean face shape obtained at Step #2 (Step #4). More specifically, shift values are found between each of the sample images and the mean face shape, for the respective feature points. In order to warp pixels in each of the sample images to the mean face shape, shift values to the mean face shape are calculated for the respective pixels in each of the sample images according to 2-dimensional 5-degree polynomials (2) to (5) using the shift values having been found:

$$x' = x + \Delta x \quad (2)$$

$$y' = y + \Delta y \quad (3)$$

$$\Delta x = \sum_{i=0}^{n} \sum_{j=0}^{n-1} a_{ij} \cdot x^i \cdot y^j \quad (4)$$

$$\Delta x = \sum_{i=0}^{n} \sum_{j=0}^{n-1} a_{ij} \cdot x^i \cdot y^j \quad (5)$$

Figure 8:
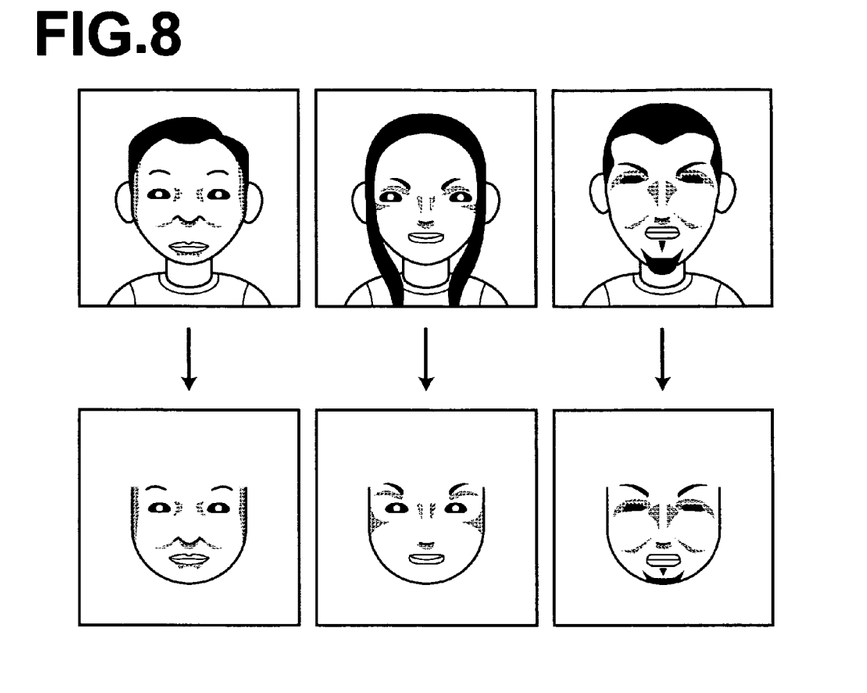
FIG. 8 shows luminance in mean face shapes converted from face shapes in sample images.

In Equations (2) to (5) above, x and y denote the coordinates of each of the feature points in each of the sample images while x' and y' are coordinates in the mean face shape to which x and y are warped. The shift values to the mean shape are represented by Δx and Δy with n being the number of dimensions while $a_{ij}$ and $b_{ij}$ are coefficients. The coefficients for polynomial approximation can be found by using a least square method. In the case that the coordinates of a feature point become non-integer values (that is, values including decimals), pixel values of four pixels (having integer coordinates) that surround the coordinates after warping are found through linear approximation of the pixel values. More specifically, for 4 pixels surrounding the coordinates of the non-integer values generated by warping, the pixel values for each of the 4 pixels are determined in proportion to a distance thereto from the coordinates generated by warping. FIG. 8 shows luminance in the mean face shape converted from the face shape of each of 3 sample images.

Thereafter, principal component analysis is carried out, based on luminance of each of the sample images after the change to the mean face shape (Step #5). As a result, the luminance in the mean face shape converted from any arbitrary face image can be approximated by Equation (6) below:

$$A = A_0 + \sum_{i=1}^{m} q_i \lambda_i \qquad (6)$$

Figure 9:
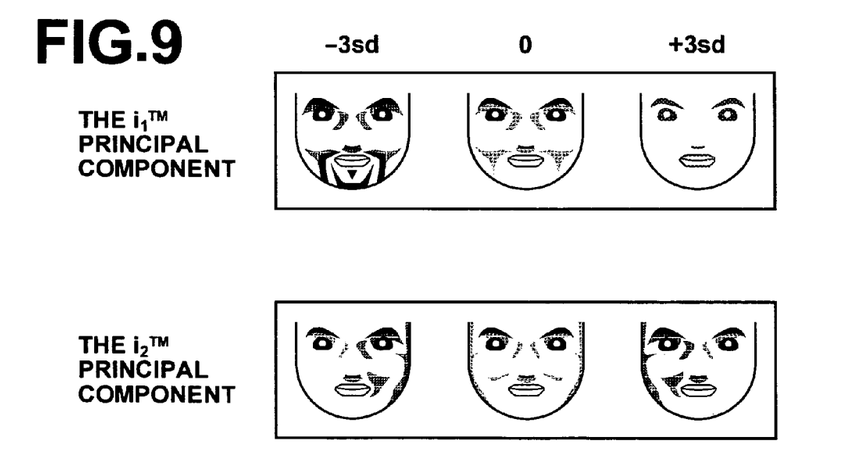
FIG. 9 shows how face luminance changes with change in values of weight coefficients for eigenvectors of principal components obtained by principal component analysis on the face luminance.

In Equation (6), A denotes a luminance vector $(a_1, \ldots, a_m)$ represented by listing the luminance at each of the pixels in the mean face shape where m is the total number of pixels in the mean face shape. $A_0$ is a mean face luminance vector represented by listing mean values of the luminance at each of the pixels in the mean face shape while $q_i$ and $\lambda_i$ refer to an eigenvector representing the $i^{th}$ principal component for the luminance in the face obtained by the principal component analysis and a weight coefficient therefor, respectively. FIG. 9 shows how face luminance changes with change in values of the weight coefficients $\lambda_{i1}$ and $\lambda_{i2}$ for the eigenvectors $q_{i1}$ and $q_{i2}$ representing the $i_1^{th}$ and $i_2^{th}$ principal components obtained through the principal component analysis. The change in the weight coefficients ranges from −3 sd to +3 sd where sd refers to standard deviation of each of the values of the weight coefficients $\lambda_{i1}$ and $\lambda_{i2}$ in the case where the luminance in each of the face sample images are represented by Equation (6) above. For each of the principal components, the face in the middle of the 3 images corresponds to the case where the corresponding weight coefficient $\lambda_{i1}$ or $\lambda_{i2}$ is the mean value. In the examples shown in FIG. 9, a component contributing to presence or absence of beard has been extracted as the $i_1^{th}$ principal component through the principal component analysis. By changing the weight coefficient $\lambda_{i1}$, the face luminance changes from the face with dense beard (corresponding to −3 sd) to the face with no beard (corresponding to +3 sd). Likewise, a component contributing to a state of shadow in the face has been extracted as the $i_2^{th}$ principal component through the principal component analysis. By changing the weight coefficient $\lambda_{i2}$, the face luminance changes from the face with the shadow on the right side thereof (corresponding to −3 sd) to the face with the shadow on the left side thereof (corresponding to +3 sd). The smaller the value of i is, the better the component explains the luminance. In other words, the component contributes more to the luminance as the value of i becomes smaller.

Through the processing from Step #1 to #5 described above, the mathematical model M is generated. More specifically, the mathematical model M is represented by the eigenvectors $p_i$ representing the face shape and the eigenvectors $q_i$ representing the face luminance in the mean face shape, and the number of the eigenvectors is far smaller for $p_i$ and for $q_i$ than the number of pixels forming the face image. In other words, the mathematical model M has been compressed in terms of dimension. In the example described in Reference 1, 122 feature points are set for a face image of approximately 10,000 pixels, and a mathematical model of face image represented by 23 eigenvectors for face shape and 114 eigenvectors for face luminance has been generated through the processing described above. By changing the weight coefficients for the respective eigenvectors, 90% of variations or more in face shape and luminance can be expressed.

A flow of the acne removal processing based on the method of AAM using the mathematical model M is described below, by reference to FIGS. 4 and 10A to 10D.

Figure 10A:
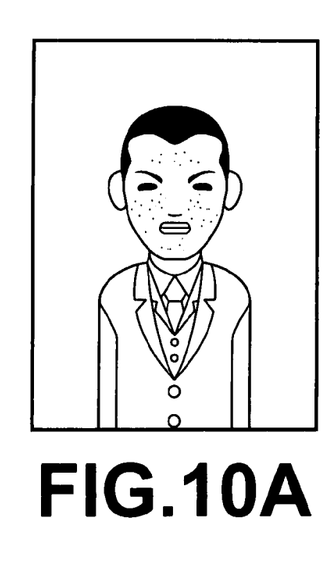
FIGS. 10A to 10D show how an input image changes during the acne removal processing of the present invention.

The face detection unit 31 reads the image data P1, and detects the face region P1ƒ (shown by FIG. 10B) in the image P1 (shown by FIG. 10A). More specifically, a first characteristic quantity representing the direction of a gradient vector showing a direction and a magnitude of an edge at each of the pixels in the image P1 is firstly input to a plurality of first detectors (which will be described later) for judgment as to whether a face candidate region exists in the image P1, as has been described in Japanese Unexamined Patent Publication No. 2005-108195 (hereinafter referred to as Reference 2). In the case where a face candidate region exists, the region is extracted, and the magnitude of the gradient vector is normalized at each of the pixels in the face candidate region. A second characteristic quantity representing the direction and the magnitude of the normalized gradient vector is then input to a second detectors (which will be described later) for judgment as to whether the extracted face candidate region is a true face region. In the case where the region is a true face region, the region is detected as the face region P1ƒ. The first/second detectors have been obtained through training using a method of machine learning such as AdaBoost that uses as input the first/second characteristic quantity calculated for face sample images and non-face sample images.

Figure 10B:
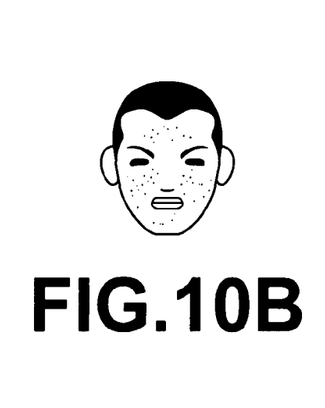
Figure 10C:
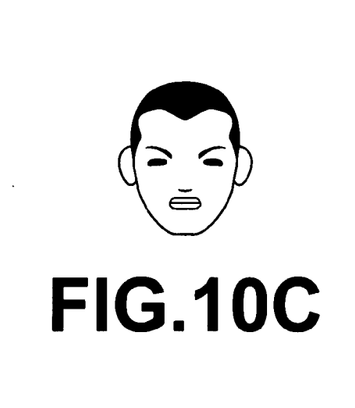
Figure 10D:
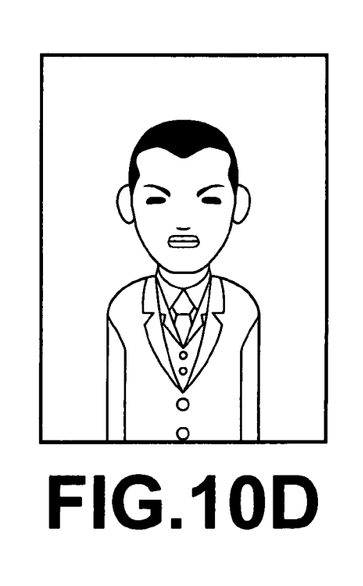

As a method of detection of the face region P1ƒ may be used various known methods such as a method using a correlation score between an eigen-face representation and an image as has been described in Published Japanese Translation of a PCT Application No. 2004-527863 (hereinafter referred to as Reference 3). Alternatively, the face region can be detected by using a knowledge base, characteristics extraction, skin-color detection, template matching, graph matching, and a statistical method (such as a method using a neural network, SVM, and HMM), for example. Furthermore, the face region P1ƒ may be specified manually by use of the keyboard 56 and the mouse 57 when the image P1 is displayed on the display 55. Alternatively, a result of automatic detection of the face region may be corrected manually.

The acne removal unit 32 fits the mathematical model M to the face region P1ƒ. More specifically, the acne removal unit 32 reconstructs the image according to Equations (1) and (6) described above while sequentially changing the values of the weight coefficients $b_i$ and $\lambda_i$ for the eigenvectors $p_i$ and $q_i$ corresponding to the principal components in order of higher order in Equations (1) and (6). The acne removal unit 32 then finds the values of the weight coefficients $b_i$ and $\lambda_i$ (hereinafter collectively called the parameters C) causing a difference between the reconstructed image and the face region P1ƒ to become minimal (see Reference 3 for details). It is preferable for the values of the weight coefficients $b_i$ and $\lambda_i$ to range only from −3 sd to +3 sd, for example, where sd refers to the standard deviation in each of distributions of $b_i$ and $\lambda_i$ when the sample images used at the time of generation of the model are represented by Equations (1) and (6). In the case where the values do not fall within the range, it is preferable for the weight coefficients to take the mean values in the distributions. In this manner, erroneous application of the model can be avoided.

The image reconstruction unit 33 generates the image P1f' (shown by FIG. 10C) through reconstruction of the image of the face region by substituting the parameters C into Equations (1) and (6). The image reconstruction unit 33 then generates the image P2 (shown by FIG. 10D) by replacing the face region P1f in the image P1 with the reconstructed image P1f', and outputs the image data P2.

As has been described above, according to the acne removal processing in the embodiment of the present invention, the acne removal unit 32 fits to the face region P1f detected by the face detection unit 31 in the image P1 the mathematical model M generated according to the method of AAM using the sample images representing human faces without acne. The image reconstruction unit 33 generates the image P1f' of the face region without acne based on the parameters C corresponding to the face region Pf1 obtained by the fitting of the mathematical model M, and obtains the image P2 by replacing the face region of the image P1 with the image P1f'. Since the mathematical model M has been generated from the sample images representing human faces without acne, acne is not represented in the model M. Therefore, even in the case where the face region P1f in the input image P1 includes acne, the representation of the face region P1f in the input image P1 by fitting the model M to the region does not include acne. In this manner, according to the acne removal processing of the present invention, acne can be removed completely through automatic processing without any manual operation. Therefore, the image P2 can be obtained with extremely high accuracy of removal, and without skills for operation and troublesome operation.

Figure 11:
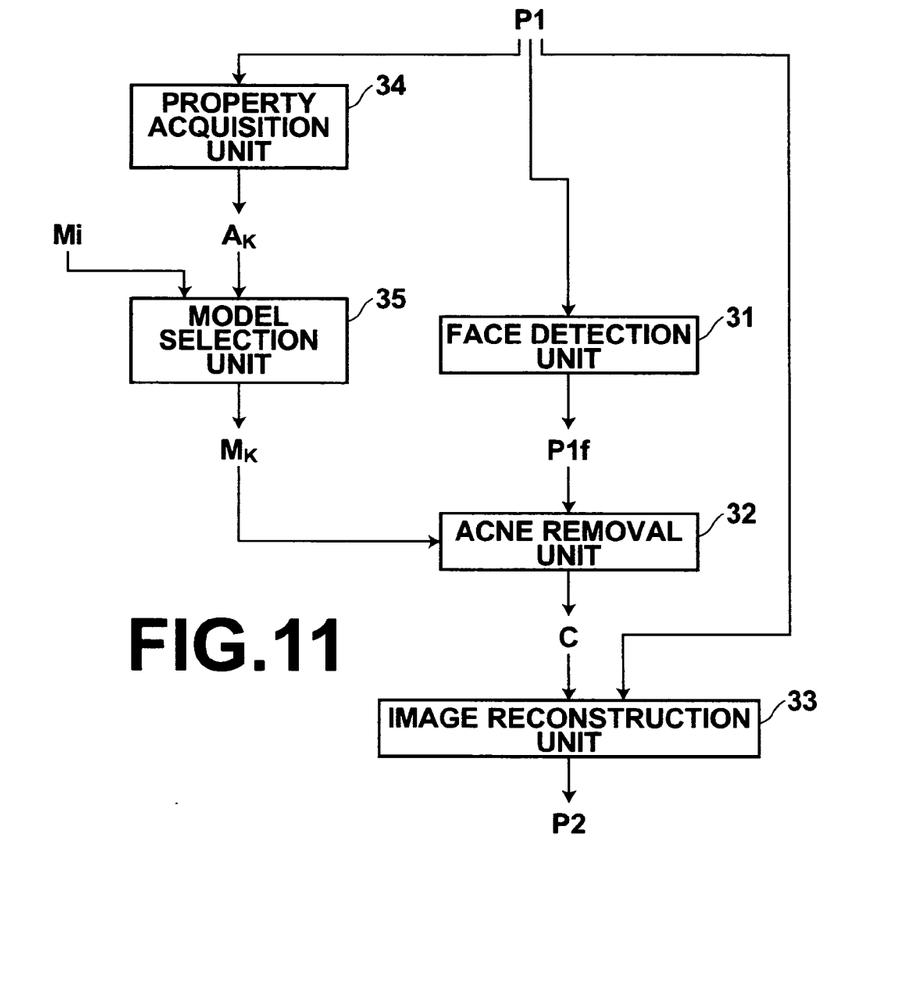
FIG. 11 is a block diagram showing an advanced aspect of the acne removal processing in the present invention.

In the embodiment described above, the mathematical model M is unique. However, a plurality of mathematical models Mi (i=1, 2, . . . ) may be generated for respective properties such as race, age, and gender, for example. FIG. 11 is a block diagram showing details of the acne removal processing in this case. As shown in FIG. 11, a property acquisition unit 34 and a model selection unit 35 are added, which is different from the embodiment shown in FIG. 4. The property acquisition unit 34 obtains property information $A_K$ of a subject in the image P1. The model selection unit 35 selects a mathematical model $M_K$ generated only from sample images representing subjects having a property represented by the property information $A_K$.

The mathematical models $M_i$ have been generated based on the method described above (see FIG. 5), only from sample images representing subjects of the same race, age, and gender, for example. The mathematical models $M_i$ are stored by being related to property information $A_i$ representing each of the properties that is common among the samples used for the model generation.

The property acquisition unit 34 may obtain the property information $A_K$ by judging the property of the subject through execution of known recognition processing (such as processing described in Japanese Unexamined Patent Publication No. 11(1999)-175724) on the image P1. Alternatively, the property of the subject may be recorded at the time of photography as accompanying information of the image P1 in a header or the like so that the recorded information can be obtained. The property of the subject may be inferred from accompanying information. In the case where GPS information representing a photography location is available, the country or a region corresponding to the GPS information can be identified, for example. Therefore, the race of the subject can be inferred to some degree. By paying attention to this fact, a reference table relating GPS information to information on race may be generated in advance. By inputting the image P1 obtained by a digital camera that obtains the GPS information at the time of photography and records the GPS information in a header of the image P1 (such as a digital camera described in Japanese Unexamined Patent Publication No. 2004-153428), the GPS information recorded in the header of the image data P1 is obtained. The information on race related to the GPS information may be inferred as the race of the subject when the reference table is referred to according to the GPS information.

The model selection unit 35 obtains the mathematical model $M_K$ related to the property information $A_K$ obtained by the property acquisition unit 34, and the acne removal unit 32 fits the mathematical model $M_K$ to the face region P1f in the image P1.

As has been described above, in the case where the mathematical models $M_i$ corresponding to the properties have been prepared, if the model selection unit 35 selects the mathematical model $M_K$ related to the property information $A_K$ obtained by the property acquisition unit 34 and if the acne removal unit 32 fits the selected mathematical model $M_K$ to the face region P1f, the mathematical model $M_K$ does not have eigenvectors contributing to variations in face shape and luminance caused by difference in the property represented by the property information $A_K$. Therefore, the face region P1f can be represented only by eigenvectors representing factors determining the face shape and luminance other than the factor representing the property. Consequently, processing accuracy improves, and the image can be obtained in higher quality.

From a viewpoint of improvement in processing accuracy, it is preferable for the mathematical models for respective properties to be specified further so that a mathematical model for each individual as a subject can be generated. In this case, the image P1 needs to be related to information identifying each individual.

In the embodiment described above, the mathematical models are installed in the digital photograph printer in advance. However, from a viewpoint of processing accuracy improvement, it is preferable for mathematical models for different human races to be prepared so that which of the mathematical models is to be installed can be changed according to a country or a region to which the digital photograph printer is going to be shipped.

The function for generating the mathematical model may be installed in the digital photograph printer. More specifically, a program for causing the arithmetic and control unit 50 to execute the processing described by the flow chart in FIG. 5 is installed therein. In addition, a default mathematical model may be installed at the time of shipment thereof. In this case, the mathematical model may be customized based on images input to the digital photograph printer. Alternatively, a new model different from the default model may be generated. This is especially effective in the case where the mathematical models for respective individuals are generated.

In the embodiment described above, the individual face image is represented by the weight coefficients $b_i$ and $\lambda_i$ for the face shape and the luminance. However, variation in the face shape is correlated to variation in the luminance. Therefore, a new appearance parameter c can be obtained for controlling both the face shape and the luminance as shown by Equations (7) and (8) below, through further execution of principal component analysis on a vector $(b_1, b_2, \ldots, b_i, \ldots, \lambda_1, \lambda_2, \ldots, \lambda_i, \ldots)$ combining the weight coefficients $b_i$ and $\lambda_i$:

$$S = S_0 + Q_S c \quad (7)$$

$$A = A_0 + Q_A c \quad (8)$$

A difference from the mean face shape can be represented by the appearance parameter c and a vector $Q_S$, and a difference from the mean face luminance can be represented by the appearance parameter c and a vector $Q_A$.

In the case where this model is used, the acne removal unit 32 finds the face luminance in the mean face shape based on Equation (8) above while changing a value of the appearance parameter c. Thereafter, the face image is reconstructed by conversion from the mean face shape according to Equation (7) above, and the value of the appearance parameter c causing a difference between the reconstructed face image and the face region P1f to be minimal is found.

Figure 12:
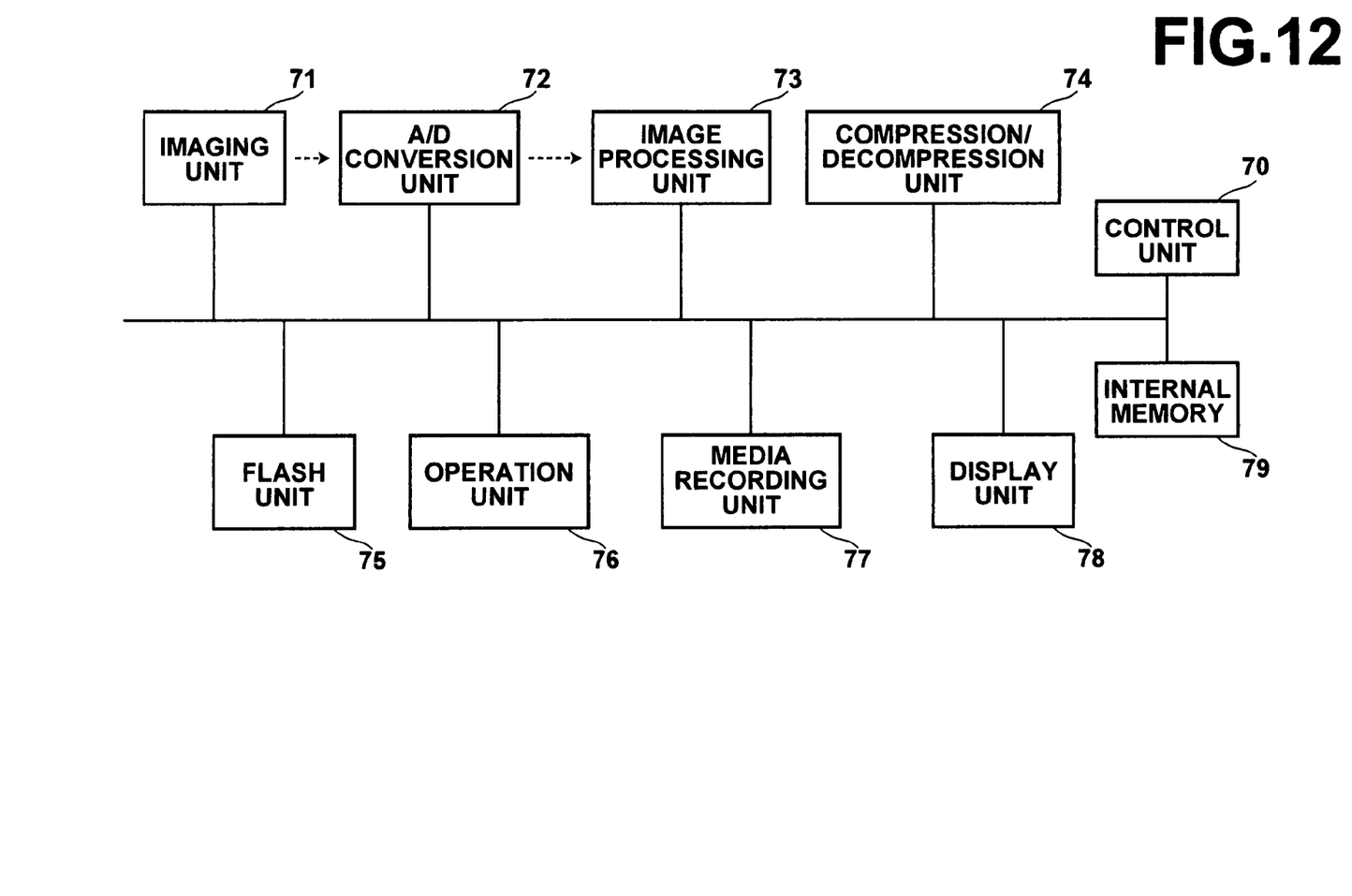
FIG. 12 shows the configuration of the digital camera in the embodiment of the present invention.

Another embodiment of the present invention can be installation of the acne removal processing in a digital camera. FIG. 12 shows the configuration of such a digital camera. As shown in FIG. 12, the digital camera has an imaging unit 71, an A/D conversion unit 72, an image processing unit 73, a compression/decompression unit 74, a flash unit 75, an operation unit 76, a media recording unit 77, a display unit 78, a control unit 70, and an internal memory 79. The imaging unit 71 comprises a lens, an iris, a shutter, a CCD, and the like, and photographs a subject. The A/D conversion unit 72 obtains digital image data P0 by digitizing an analog signal represented by charges stored in the CCD of the imaging unit 71. The image processing unit 73 carries out various kinds of image processing on image data such as the image data P0. The compression/decompression unit 74 carries out compression processing on image data to be stored in a memory card, and carries out decompression processing on image data read from a memory card in a compressed form. The flash unit 75 comprises a flash and the like, and carries out flash emission. The operation unit 76 comprises various kinds of operation buttons, and is used for setting a photography condition, an image processing condition, and the like. The media recording unit 77 is used as an interface with a memory card in which image data are stored. The display unit 78 comprises a liquid crystal display (hereinafter referred to as the LCD) and the like, and is used for displaying a through image, a photographed image, various setting menus, and the like. The control unit 70 controls processing carried out by each of the units. The internal memory 79 stores a control program, image data, and the like.

The functions of the image input means 1 in FIG. 2 are realized by the imaging unit 71 and the A/D conversion unit 72. Likewise, the functions of the image correction means 2 are realized by the image processing unit 73 while the functions of the image manipulation means 3 are realized by the image processing unit 73, the operation unit 76, and the display unit 78. The functions of the image output means 4 are realized by the media recording unit 77. All of the functions described above are realized under control of the control unit 70, by using the internal memory 79 in addition.

Operation of the digital camera and a flow of processing therein are described next.

The imaging unit 71 causes light entering the lens from a subject to form an image on a photoelectric surface of the CCD when a photographer fully presses a shutter button. After photoelectric conversion, the imaging unit 71 outputs an analog image signal, and the A/D conversion unit 72 converts the analog image signal output from the imaging unit 71 to a digital image signal. The A/D conversion unit 72 then outputs the digital image signal as the digital image data P0. In this manner, the imaging unit 71 and the A/D conversion unit 72 function as the image input means 1.

Thereafter, the image processing unit 73 carries out automatic white balance adjustment, white balance adjustment according to the type of light source, gradation correction, density correction, color correction, and sharpness processing, and outputs corrected image data P1. In this manner, the image processing unit 73 functions as the image correction means 2.

The image P1 is displayed on the LCD of the display unit 78. As a manner of this display can be used display of thumbnail images as shown in FIG. 3A. While operating the operation buttons of the operation unit 76, the photographer selects and enlarges one of the images to be processed, and carries out selection from a menu for further manual image correction or manipulation. In the case where "Acne Removal" is selected at this stage, the control unit 70 starts a program for acne removal stored in the internal memory 79, and causes the image processing unit 73 to carry out the acne removal processing (see FIG. 4) using the mathematical model M stored in advance in the internal memory 79, as has been described above. Processed image data P2 are then output. In this manner, the functions of the image manipulation means 3 are realized.

The compression/decompression unit 74 carries out compression processing on the image data P2 according to a compression format such as JPEG, and the compressed image data are written via the media recording unit 77 in a memory card inserted in the digital camera. In this manner, the functions of the image output means 4 are realized.

By installing the acne removal processing of the present invention as the image processing function of the digital camera, the same effect as in the case of the digital photograph printer can be obtained.

The manual correction and manipulation may be carried out on the image having been stored in the memory card. More specifically, the compression/decompression unit 74 decompresses the image data stored in the memory card, and the image after the decompression is displayed on the LCD of the display unit 78. The photographer selects desired image processing as has been described above, and the image processing unit 73 carries out the selected image processing.

Furthermore, the mathematical models for respective properties of subjects described by FIG. 11 may be installed in the digital camera. In addition, the processing for generating the mathematical model described by FIG. 5 may be installed therein. A person as a subject of photography is often fixed to some degree for each digital camera. Therefore, if the mathematical model is generated for the face of each individual as a frequent subject of photography with the digital camera, the model can be generated without variation of individual difference in face. Consequently, the acne removal processing can be carried out with extremely high accuracy for the face of the person.

A program for causing a personal computer or the like to carry out the acne removal processing of the present invention may be incorporated with photo retouching software. In this manner, a user can use the acne removal processing of the present invention as an option of image editing and manipulation on his/her personal computer, by installation of the software from a recording medium such as a CD-ROM to the personal computer, or by installation of the software through downloading of the software from a predetermined Web site on the Internet.

In the above description, the case has been described where the image processing of the present invention is applied to removal of acne in a face image. However, the target of removal is not limited to acne, and a component such as a wrinkle, a spot, a small scar, stubble, a flare, or the like can be removed from an image in the same manner as has been described above, by generating a mathematical model based on sample images without the component.

What is claimed is:

1. An image processing method for removing a first component which is included in a predetermined structure in an input image, comprising the steps of:

obtaining weighting parameters for statistical characteristic quantities corresponding to the predetermined structure in the input image by fitting to the predetermined structure in the input image a model representing the predetermined structure that does not include the first component, the model obtained through execution of predetermined statistical processing on a plurality of images representing the predetermined structure not having the first component, and the model representing the structure by one or more statistical characteristic quantities representing components in the structure other than the first component to be removed and by one or more weighting parameters for weighting the corresponding statistical characteristic quantities according to an individual characteristic of the predetermined structure; and generating an output image in which the first component has been removed based on the obtained weighting parameters and the statistical characteristic quantities.

2. An image processing apparatus for removing a first component which is included in a predetermined structure in an input image, comprising:

a model representing the predetermined structure that does not include the first component by one or more statistical characteristic quantities representing components in the structure other than the first component to be removed and by one or more weighting parameters for weighting the corresponding statistical characteristic quantities according to an individual characteristic of the predetermined structure, the model obtained through execution of predetermined statistical processing on a plurality of images representing the predetermined structure not having the first component;

obtaining means for obtaining weighting parameters for statistical characteristic quantities corresponding to the predetermined structure in the input image by fitting the model to the predetermined structure in the input image; and means for generating an output image in which the first component has been removed based on the obtained weighting parameters and the statistical characteristic quantities.

3. The image processing apparatus according to claim 2 further comprising detection means for detecting the predetermined structure in the input image, wherein the obtaining means fits the model to the structure having been detected by the detection means.

4. The image processing apparatus according to claim 2 further comprising:

a plurality of the models representing the predetermined structure for respective properties of the structure; and selection means for obtaining at least one property of the structure in the input image and for selecting the model corresponding to the obtained property, wherein the obtaining means fits the model selected by the selection means to the structure in the input image.

5. The image processing apparatus according to claim 2, wherein the predetermined structure is a human face.

6. The image processing apparatus according to claim 2 wherein the first component to be removed is at least one of acne, a wrinkle, a spot, a small scar, stubble, and a flare.

7. The image processing apparatus according to claim 2, wherein the model and the fitting of the model are realized by a method of Active Appearance Model.

8. A computer-readable recording medium storing an image processing program for removing a first component which is included in a predetermined structure in an input image, said processing program causing a computer to carry out the procedure of:

obtaining weighting parameters for statistical characteristic quantities corresponding to the predetermined structure in the input image by fitting to the predetermined structure in the input image a model representing the predetermined structure that does not include the first component, the model obtained through execution of predetermined statistical processing on a plurality of images representing the predetermined structure not having the first component, and the model representing the predetermined structure by one or more statistical characteristic quantities representing components in the structure other than the first component to be removed and by one or more weighting parameters for weighting the corresponding statistical characteristic quantities according to an individual characteristic of the predetermined structure; and generating an output image in which the first component has been removed based on the obtained weighting parameters and the statistical characteristic quantities.

* * * * *